US008902625B2

(12) United States Patent
Holt et al.

(10) Patent No.: US 8,902,625 B2
(45) Date of Patent: Dec. 2, 2014

(54) LAYOUTS FOR MEMORY AND LOGIC CIRCUITS IN A SYSTEM-ON-CHIP (71) Applicant: Marvell World Trade Ltd., St. Michael (BB)

(72) Inventors: Joseph Holt, Northglenn, CO (US); Roy Mader, Longmont, CO (US); Brandon Greiner, Firestone, CO (US); Scott B. Anderson, Longmont, CO (US)

(73) Assignee: Marvell World Trade Ltd., St. Michael (BB)

( * ) Notice: Subject to any disclaimer, the term of this patent is extended or adjusted under 35 U.S.C. 154(b) by 109 days.

(21) Appl. No.: 13/680,530

(22) Filed: Nov. 19, 2012

(65) Prior Publication Data
US 2013/0128648 A1  May 23, 2013

Related U.S. Application Data (60) Provisional application No. 61/563,001, filed on Nov. 22, 2011.

(51) Int. Cl.
G11C 5/06 (2006.01)
G11C 5/02 (2006.01)
G06F 17/50 (2006.01)
H01L 27/105 (2006.01)
H01L 27/02 (2006.01)

(52) U.S. Cl.
CPC .. G11C 5/06 (2013.01); G11C 5/02 (2013.01); H01L 27/105 (2013.01); H01L 27/0207 (2013.01); G06F 17/5072 (2013.01); G06F 17/505 (2013.01)
USPC .................................. 365/63; 365/51; 365/67

(58) Field of Classification Search
CPC ....... G11C 5/063; G11C 7/18; G11C 11/4097
USPC .................................................. 365/63, 51, 67
See application file for complete search history.

(56) References Cited

U.S. PATENT DOCUMENTS

| 5,767,565 | A  |   | 6/1998  | Reddy |
| 5,892,703 | A  |   | 4/1999  | Raad |
| 6,625,073 | B1 | * | 9/2003  | Beffa .............................. 365/201 |
| 6,687,147 | B2 | * | 2/2004  | Fricke et al. ..................... 365/63 |
| 6,717,430 | B2 | * | 4/2004  | Burch ....................... 324/750.18 |
| 7,295,476 | B2 | * | 11/2007 | Matsubara et al. ...... 365/185.33 |
| 7,626,883 | B2 | * | 12/2009 | Shimano et al. .............. 365/226 |
| 7,788,619 | B2 |   | 8/2010  | Sim |
| 2010/0002526 | A1 |   | 1/2010  | Dillon et al. |
| 2011/0103162 | A1 |   | 5/2011  | Park |

FOREIGN PATENT DOCUMENTS

EP  2159799 A1  3/2010

OTHER PUBLICATIONS

PCT Invitation and Partial International Search Annex for related Application No. PCT/US2012/066236; Mar. 11, 2013; 7 pages.

* cited by examiner

Primary Examiner — Connie Yoha (57) ABSTRACT

An integrated circuit including a plurality of memory circuits and a plurality of logic circuits. The plurality of memory circuits is arranged on a die along a plurality of rows and a plurality of columns. Each memory circuit includes a plurality of memory cells. The plurality of logic circuits is arranged on the die between the plurality of memory circuits along the plurality of rows and the plurality of columns. The plurality of logic circuits is configured to communicate with one or more of the memory circuits.

18 Claims, 6 Drawing Sheets

LAYOUTS FOR MEMORY AND LOGIC CIRCUITS IN A SYSTEM-ON-CHIP

CROSS-REFERENCE TO RELATED APPLICATIONS

This application claims the benefit of U.S. Provisional Application No. 61/563,001, filed on Nov. 22, 2011. The entire disclosure of the above application is incorporated herein by reference.

FIELD

The present disclosure relates generally to integrated circuits (ICs) and more particularly to layouts for memory and logic circuits in a system-on-chip (SOC).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

A system-on-chip (SOC) typically includes a processor and memory to process data. SOCs may be used to process data in many devices. For example, SOCs may be used to process data in storage devices including hard disk drives (HDDs), optical disc drives, and solid-state disks. Additionally, SOCs may be used to process data in communication devices including smartphones, routers, network switches, and so on.

Figure 1:
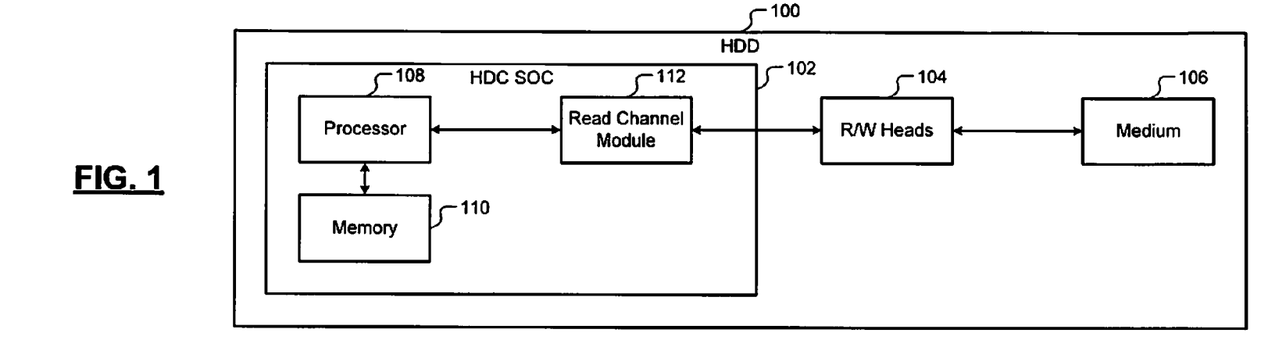
FIG. 1 is a functional block diagram of a hard disk drive (HDD)

Referring now to FIG. 1, a HDD 100 includes a hard disk controller (HDC) SOC 102, a plurality of read/write heads 104, and a magnetic medium 106. The HDC SOC 102 controls the operation of the HDD 100. The read/write heads 104 read/write data on the magnetic medium 106. The HDC SOC 102 includes a processor 108, memory 110, and a read/write channel module (generally referred to as read channel module) 112. The processor 108 processes data related to the HDD 100. The processor 108 uses memory 110 to process the data. The read channel module 112 reads and writes data on the magnetic medium 106 using read/write heads 104. The read channel module 112 may encode and modulate data to be written on the magnetic medium 106 and may demodulate and decode data read form the magnetic medium 106. The read channel module 112 may also perform error-correction on read data.

Figure 2:
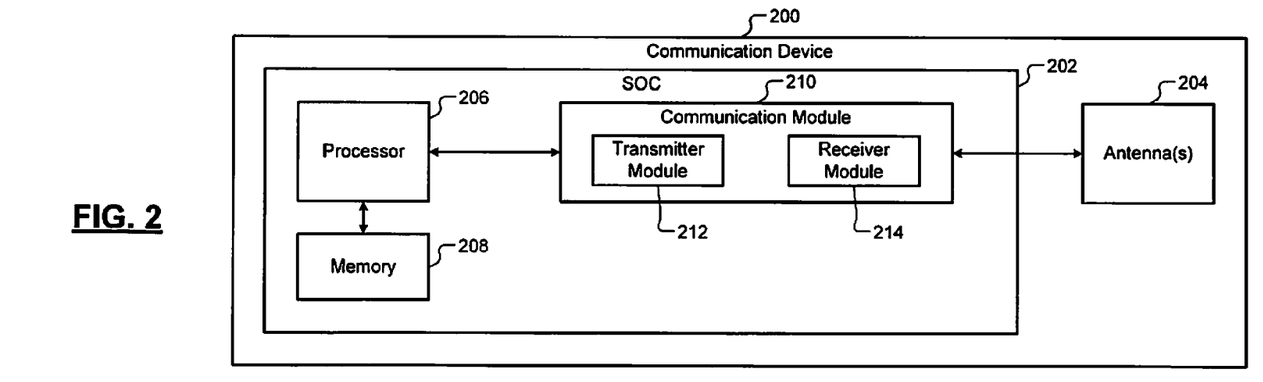
FIG. 2 is a functional block diagram of a communication device.

Referring now to FIG. 2, a communication device 200 includes a SOC 202 to control the operation of the communication device 200. The communication device 200 may also include one or more antennas 204 if the communication device 200 is a wireless communication device. The SOC 202 includes a processor 206, memory 208, and a communication module 210. The processor 206 processes data related to the communication device 200. The processor 206 uses memory 208 to process the data. The communication module 210 includes a transmitter module 212 to transmit data and a receiver module 214 to receive data. The communication module 210 may encode and modulate data to be transmitted and may demodulate and decode received data. The communication module 210 may also perform error-correction on received data.

SUMMARY

An integrated circuit comprises a plurality of memory circuits and a plurality of logic circuits. The plurality of memory circuits is arranged on a die along a plurality of rows and a plurality of columns. Each memory circuit includes a plurality of memory cells. The plurality of logic circuits is arranged on the die between the plurality of memory circuits along the plurality of rows and the plurality of columns. The plurality of logic circuits is configured to communicate with one or more of the memory circuits.

In other features, the plurality of rows and the plurality of columns are arranged in an area away from a perimeter of the die.

In other features, the memory cells include latch-based random access memory cells.

In other features, the logic circuits include at least one of combinational and sequential logic circuits.

In other features, the memory circuits have a predetermined memory capacity.

In other features, at least one of the plurality of memory circuits has a different memory capacity than others of the plurality of memory circuits.

In other features, at least one of the logic circuits is configured to process signals during a read or a write operation of a storage device, wherein the storage device includes a hard disk drive, an optical disc drive, or a solid-state disk, and to store data generated by the processing in one or more of the memory circuits.

In other features, at least one of the logic circuits is configured to process signals during a transmit or a receive operation of a communication device, and to store data generated by the processing in one or more of the memory circuits.

In other features, a first one of the logic circuits is configured to (i) retrieve first data from a first one of the memory circuits, (ii) generate second data by processing the first data, and (iii) store the second data in a second one of the memory circuits. A second one of the logic circuits is configured to (i) retrieve the second data from the second one of the memory circuits, (ii) generate third data by processing the second data, and (iii) store the third data in the first one of the memory circuits. The first one of the logic circuits is configured to process the third data.

In still other features, a system comprises an input module and a processing module. The input module is configured to receive data including (i) a list of memory circuits and logic circuits to be arranged on a die, (ii) timing of input and output signals of the memory circuits and the logic circuits, and (iii) an area of the die. The processing module is configured to process the data, determine whether an area of a plurality of the logic circuits configured to communicate with a plurality of the memory circuits is greater than or equal to a predetermined percentage of an area of the plurality of the memory circuits, and arrange the memory circuits and the logic circuits in an array-type layout on the area of the die in response to the area of the plurality of the logic circuits being greater than or equal to the predetermined percentage of the area of the plurality of the memory circuits.

In other features, the processing module is configured to determine parameters including spacing between rows and columns of the array-type layout.

In other features, the processing module is configured to distribute the logic circuits in the array-type layout according to the timing of input and output signals of the memory circuits and the logic circuits.

In other features, the processing module is configured to distribute the logic circuits in the array-type layout according to connections of the memory circuits and the logic circuits.

In still other features, a method comprises receiving data including (i) a list of memory circuits and logic circuits to be arranged on a die, (ii) timing of input and output signals of the memory circuits and the logic circuits, and (iii) an area of the die. The method further comprises and processing the data and determining whether an area of a plurality of the logic circuits configured to communicate with a plurality of the memory circuits is greater than or equal to a predetermined percentage of an area of the plurality of the memory circuits. The method further comprises arranging the memory circuits and the logic circuits in an array-type layout on the area of the die in response to the area of the plurality of the logic circuits being greater than or equal to the predetermined percentage of the area of the plurality of the memory circuits.

In other features, the method further comprises determining parameters including spacing between rows and columns of the array-type layout.

In other features, the method further comprises distributing the logic circuits in the array-type layout according to the timing of input and output signals of the memory circuits and the logic circuits.

In other features, the method further comprises distributing the logic circuits in the array-type layout according to connections of the memory circuits and the logic circuits.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

Memory and logic circuits (e.g., logic circuits of the read channel module 112 or the communication module 210) can be arranged on a die in different ways. For example, in a first arrangement, the memory circuits can be arranged along a perimeter of the die, and the logic circuits can be arranged at a center of the die. In a second arrangement, a first portion of the memory circuits can be arranged along the perimeter, a second portion of the memory circuits can be arranged at the center, and the logic circuits can be arranged between the first and second portions.

The present disclosure relates to arranging the memory and logic circuits on the die in an array style layout. Arranging the memory and logic circuits in the array style layout provides several benefits. For example, the array style layout utilizes die area more efficiently than the first and second arrangements. That is, more memory and logic circuits can be arranged on a given die area when the array style layout is used than when the first or second arrangement is used. In other words, for a given number of memory and logic circuits, the array style layout uses less die are than the first or second arrangement. Additionally, communication between the memory and logic circuits can be faster when the array style layout is used than when the first or second arrangement is used.

Figure 3:
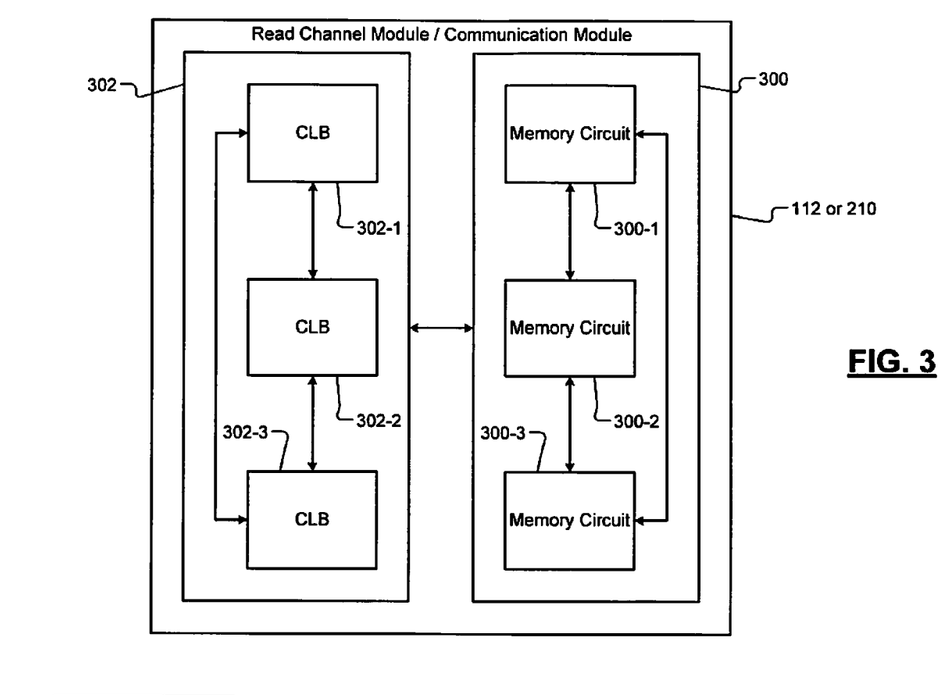
FIG. 3 is a functional block diagram of a read channel module of the HDD of FIG. 1 or a communication module of the communication device of FIG. 2.

Referring now to FIG. 3, the read channel module 112 or the communication module 210 may be implemented in a SOC using a plurality of memory circuits 300-1, 300-2, 300-3 (collectively memory circuits 300) and a plurality of configurable logic blocks (CLBs) 302-1, 302-2, 300-3 (collectively CLBs 302). Each CLB 302 can include combinational and/or sequential logic circuits. Each CLB 302 can be configured to perform one or more different operations. Each memory circuit 300 may include a plurality of memory cells. For example, each memory circuit 300 may include a plurality of memory cells of latch-based random access memory (LBRAM). Each memory circuit 300 may have a predetermined memory capacity (on the order of a few KB, MB, or GB). Some of the memory circuits 300 may have different memory capacities than the rest of the memory circuits 300. While only three memory circuits 300 and three CLBs 302 are shown, N number of memory circuits 300 and N number of CLBs 302 may be used, where N is an integer greater than 1.

One CLB 302 may communicate with one or more memory circuits 300. One CLB 302 may communicate with one or more CLBs 302. One memory circuit 300 may communicate with one or more memory circuits 300. Data processed by a first CLB 302 may be stored in a first memory circuit 300; data processed by a second CLB 302 may be stored in a second memory circuit 300; and so on. Additionally, the first CLB 302 may process data stored in the second memory circuit 300, and so on. Accordingly, when correcting errors (e.g., using iterative processing), the first CLB 302 can update data processed by the second CLB 302, and the data updated by the first CLB 302 can be processed again by the second CLB 302 and/or a third CLB 302, and so on.

Figure 4:
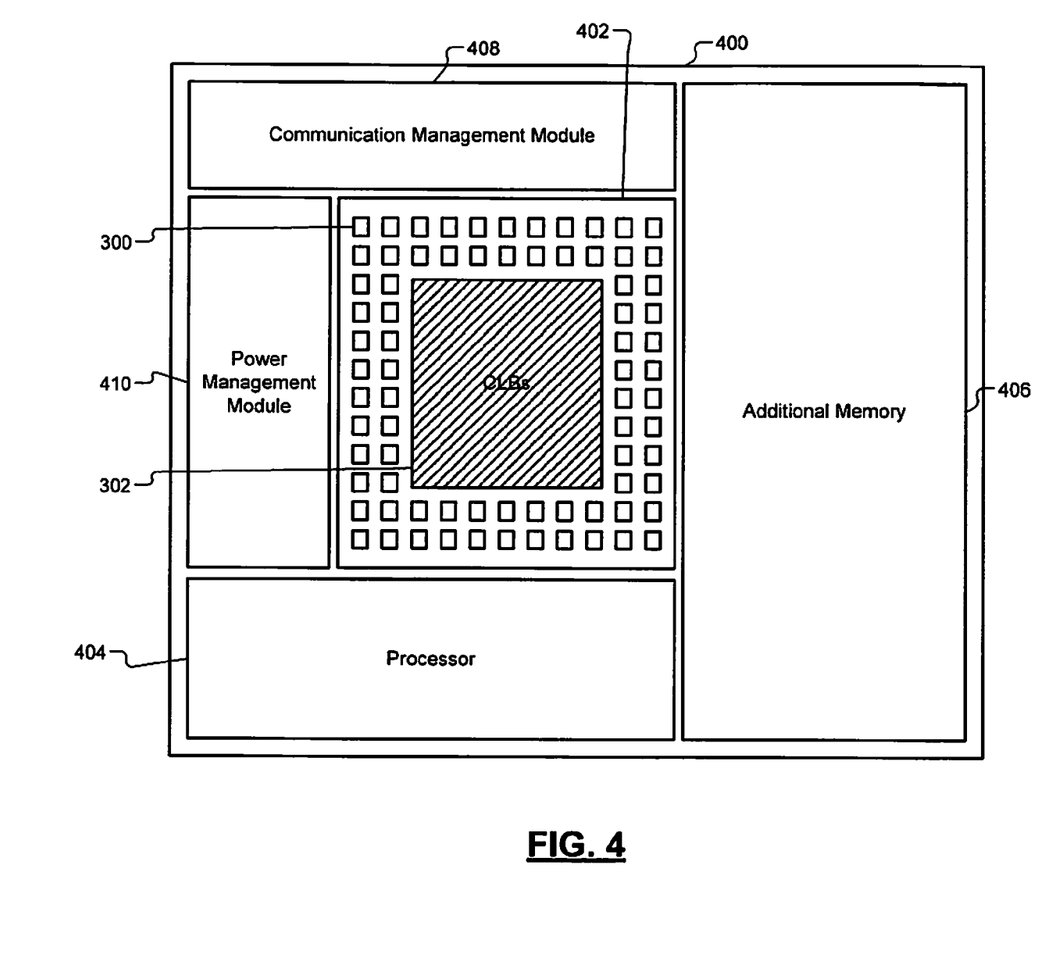
FIG. 4 depicts a system-on-chip (SOC) including a layout of memory circuits and configurable logic blocks (CLBs), where the memory circuits arranged along a perimeter of the layout, and the CLBs are arranged at a center of the layout.

Referring now to FIG. 4, a SOC 400 comprising a layout 402 of the memory circuits 300 and the CLBs 302 is shown. The SOC 400 may include additional components. For example, the SOC 400 may include a processor 404 and additional memory 406 to process data related to the SOC 400, a communication module 408 to communicate with components external to the SOC 400, and a power management module 410 to manage power consumption of one or more components of the SOC 400.

In the layout 402, the memory circuits 300 are arranged along a perimeter of the layout 402 (i.e., parallel to a perimeter of the SOC 400), and the CLBs 302 are arranged at a center of the layout 402. Accordingly, the memory circuits 300 surround the CLBs 302. Signal paths between CLBs 302 and memory circuits 300 can be longer than signal paths between two CLBs 302. Accordingly, CLB-to-memory circuit communications can be slower than CLB-to-CLB communications. Consequently, speed of memory-intensive processing (e.g., iterative processing involved in error correction) can be unacceptable. Additionally, the layout 402 tends to underutilize and therefore waste die area.

Alternatively, while not shown, positions of the memory circuits 300 and the CLBs 302 can be reversed. That is, the CLBs 302 can be arranged along the perimeter of the layout 402, and the memory circuits 300 can be arranged at the center of the layout 402. Accordingly, the CLBs 302 will surround the memory circuits 300. In such an arrangement, while the speed of CLB-to-memory circuit communication may improve relative to the layout 402, the speed of CLB-to-CLB communication may degrade relative to the layout 402.

Figure 5:
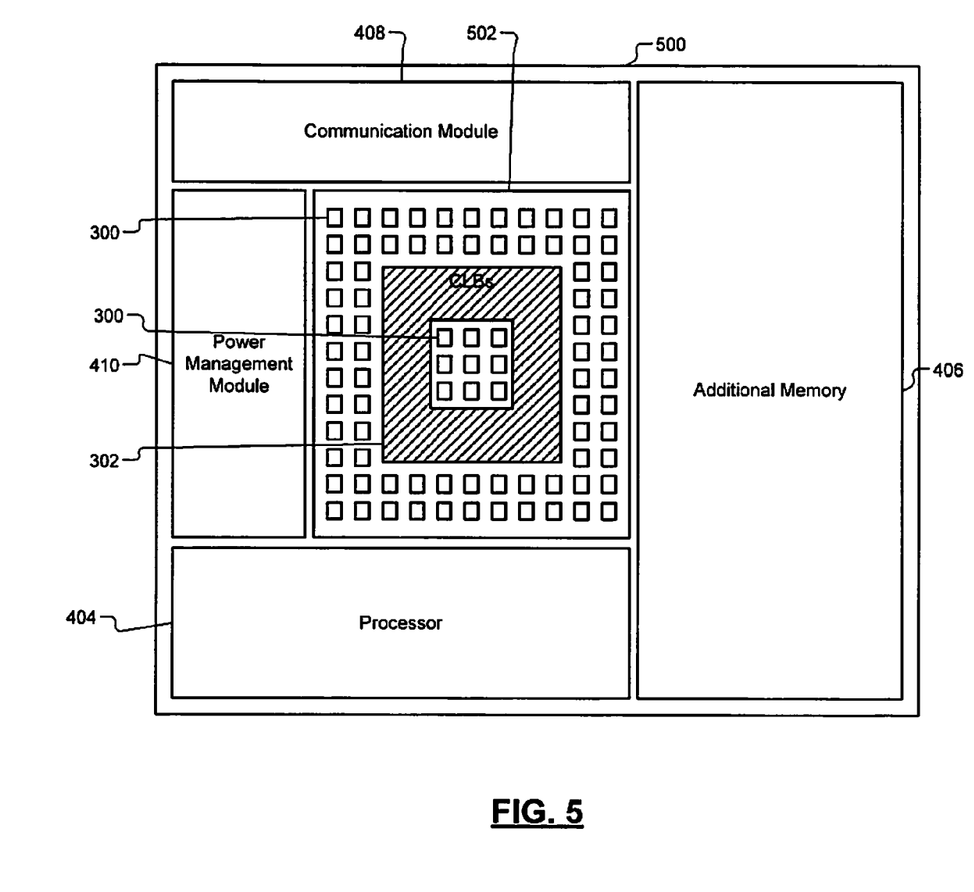
FIG. 5 depicts a SOC including a layout of memory circuits and CLBs, where first and second sets of the memory circuits are respectively arranged along a perimeter and a center of the layout, and the CLBs are arranged between the first and second sets of the memory circuits.

Referring now to FIG. 5, a SOC 500 comprising a layout 502 of the memory circuits 300 and the CLBs 302 is shown. The SOC 500 may include one or more components of the SOC 400 other than the layout 402. In the layout 502, a first plurality of the memory circuits 300 is arranged along a perimeter of the SOC 500, and a second plurality of the memory circuits 300 is arranged at a center of the layout 502. The CLBs 302 are arranged between the first plurality and the second plurality of the memory circuits 300. The second plurality of memory circuits 300 may use a different type of memory than the first plurality of memory circuits 300. The layout 502, however, may not improve the speed of CLB-to-memory circuit communication significantly relative to the layout 402.

Figure 6:
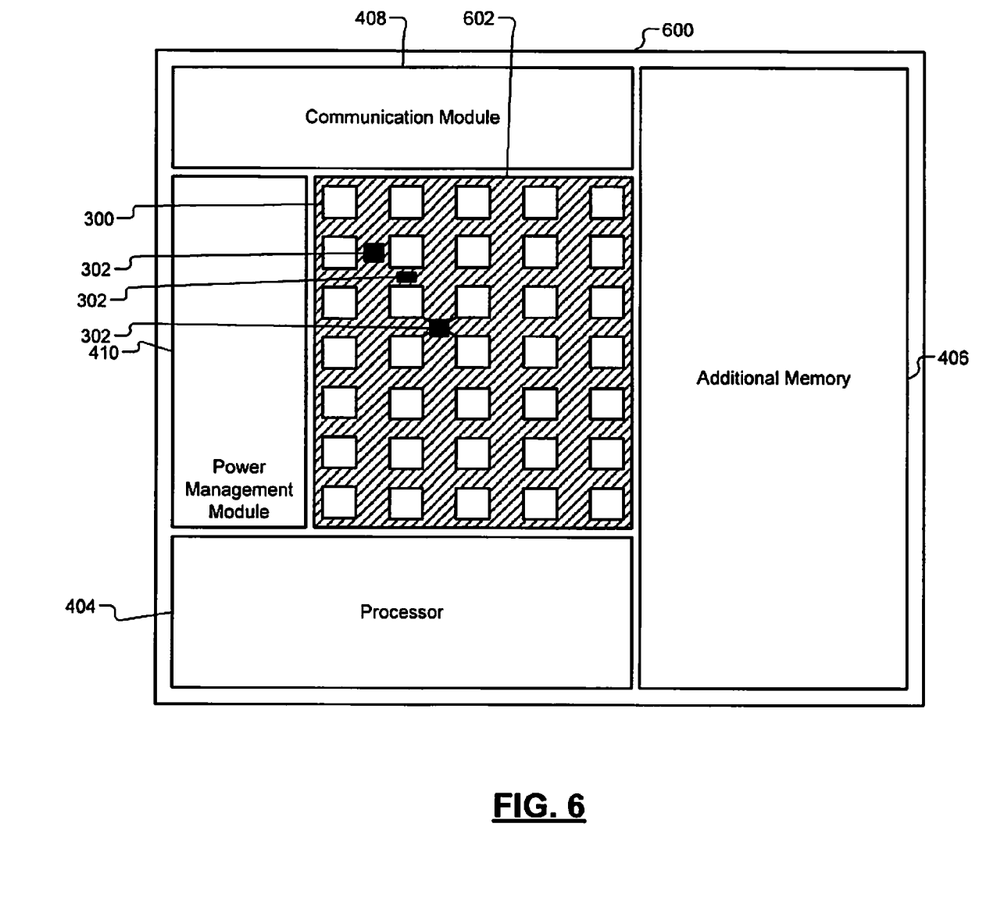
FIG. 6 depicts a SOC including a layout of memory circuits and CLBs arranged in an array.

Referring now to FIG. 6, a SOC 600 comprising a layout 602 of the memory circuits 300 and the CLBs 302 is shown. The SOC 500 may include one or more components of the SOC 400 other than the layout 402. In the layout 602, the memory circuits 300 are not arranged along a perimeter of the SOC 600. Instead, the memory circuits 300 are arranged in an array along a plurality of rows and columns. The rows and columns are parallel to the sides of the SOC 600. The CLBs 302 are arranged between the memory circuits 300 also in the array along the rows and columns. The array is located in an area away from the perimeter of the SOC 600.

Accordingly, a first CLB 302 may be arranged between two memory circuits 300 along a row, and a second CLB 302 may be arranged between two memory circuits 300 along a column. A third CLB 302 may be arranged at an intersection of diagonals of a rectangle whose four vertices are two adjacent memory circuits 300 located along a first column (or first row) and two adjacent memory circuits 300 along a second column (or second row), where the first column (or first row) is adjacent to the second column (or second row).

The CLBs 302 can be arranged such that signal paths between the CLBs 302 and the memory circuits 300 are optimized using a layout device described below. Accordingly, the layout 602 improves the speed of CLB-to-memory circuit communication significantly relative to the layouts 402 and 502. Additionally, the layout 602 utilizes die area of the SOC 600 more efficiently than the layouts 402 and 502. Accordingly, the layout 602 can utilize more number of CLBs 302 and/or memory circuits 300 than the layouts 402 and 502 for a given die area. Alternatively, for a given number of CLBs 302 and memory circuits 300, the layout 602 occupies less die area than the layouts 402 and 502. Consequently, for a given number of CLBs 302 and memory circuits 300, the die size of the SOC 600 using the layout 602 can be smaller than the SOCs 400 and 500 using the layouts 402 and 502, respectively.

Figure 7:
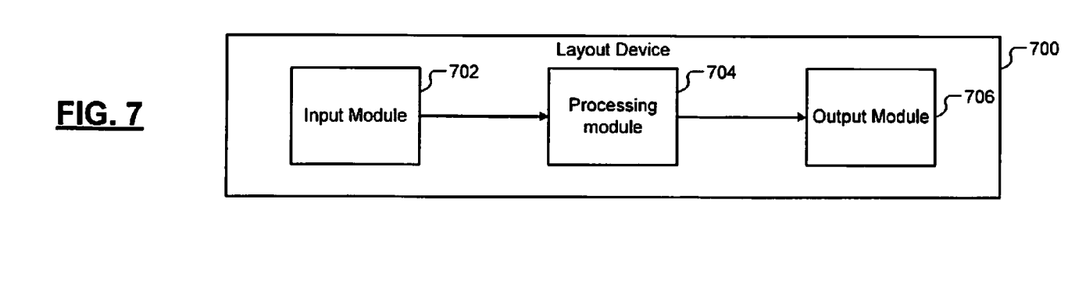
FIG. 7 is a functional block diagram of a layout device that determines feasibility and parameters of the layout of FIG. 6.

Referring now to FIG. 7, a layout device 700 includes an input module 702, a processing module 704, and an output module 706. The layout device 700 determines whether the layout 602 can be used for a given circuit design or a portion thereof (i.e., determines feasibility of the layout 602) and determines parameters of the layout 602 including row/column spacing and members of the rows and columns.

As explained below, the input module 702 receives a plurality of inputs. The processing module 704 executes a software program that processes the plurality of inputs and determines the feasibility and parameters of the layout 602. The output module 706 outputs results of the processing including the feasibility and parameters of the layout 602.

Figure 8:
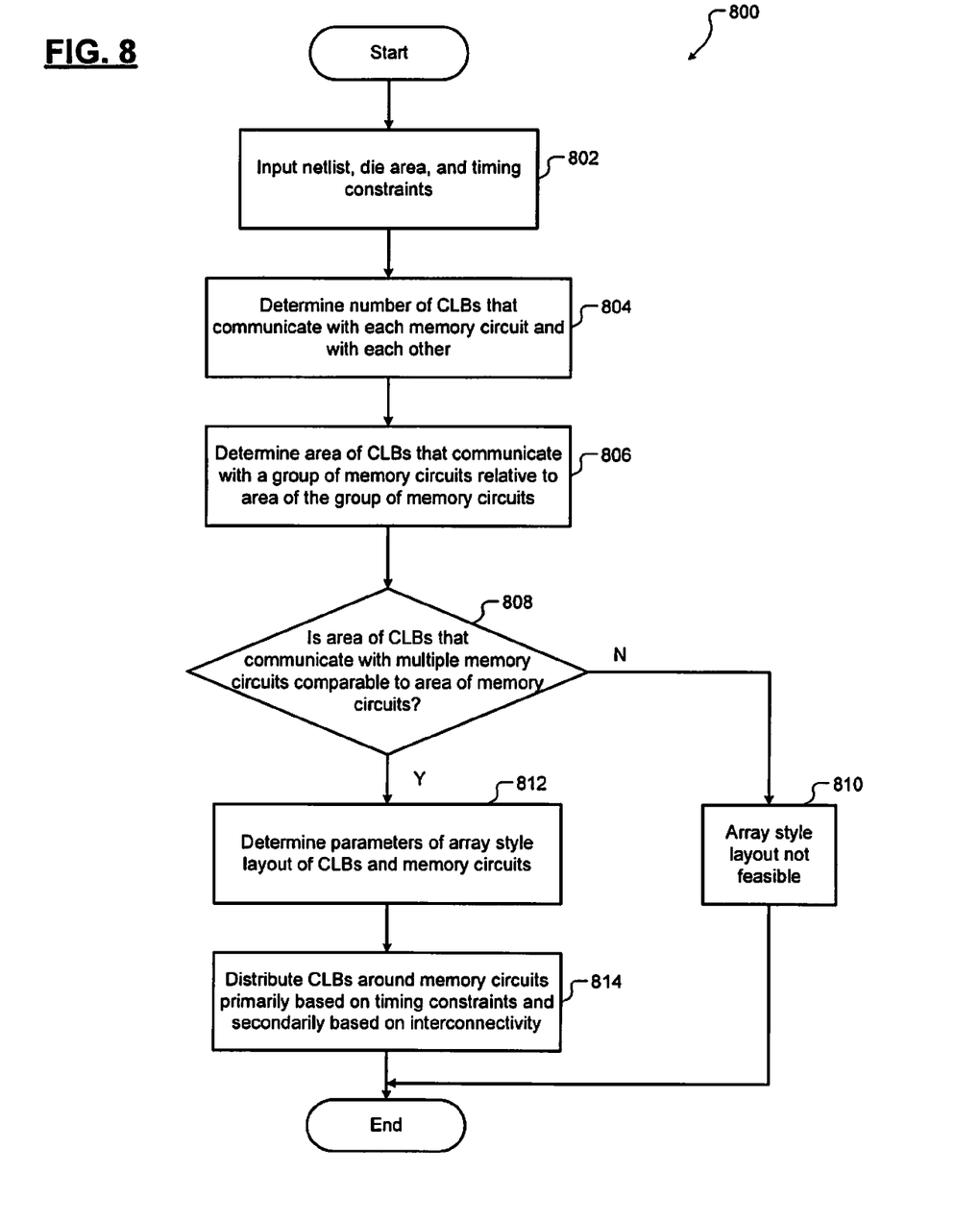
FIG. 8 is a flowchart of a method for determining feasibility and parameters of the layout of FIG. 6.

Referring now to FIG. 8, a method 800 for determining feasibility and parameters of the layout 602 is shown. At 802, control receives a plurality of inputs including circuit interconnections (e.g., a netlist), timing constraints (e.g., clock definitions, etc.), and die area. At 804, control determines a number of CLBs 302 that communicate with each memory circuit 300 and with each other. At 806, control determines the area of the CLBs 302 that communicate with a group of memory circuits 300. At 808, control determines whether the area of the CLBs 302 that communicate with multiple memory circuits 300 is comparable to (e.g., a predetermined percentage of) the area of the memory circuits 300 with which the CLBs 302 communicate.

At 810, control determines that an array style layout is not feasible for the CLBs 302 and the memory circuits 300 if the area of the CLBs 302 is not comparable to the area of the memory circuits 300. At 812, if the area of the CLBs 302 is comparable to the area of the memory circuits 300, control determines that an array style layout is feasible for the CLBs 302 and the memory circuits 300 and determines parameters for the array style layout. The parameters for the array style layout include row/column spacing; grouping, distribution, and location of the CLBs 302 around the memory circuits 300; and so on.

At 814, control distributes the CLBs 302 around the memory circuits 300 primarily based on timing constraints and secondarily based on interconnections between the CLBs 302 and the memory circuits 300. For example, in a group of CLBs 302 that communicate with a group of memory circuits 300, if a CLB 302 uses signal paths having relaxed timing requirements (i.e., longer signal paths), control can locate the CLB 302 farther from the group of CLBs 302 and/or the group of memory circuits 300 than the rest of the CLBs 302 in the group.

In one implementation, the inputs may include circuit connectivity information (e.g., Netlist, typically in Verilog), timing constraints (e.g., clock definitions, delays, etc.), and so on. The inputs may also include timing models for circuits (e.g., library files, Spice data, etc.). The inputs may also include physical information for circuits (e.g., using Milkway database) if area is not included in the timing models.

In static timing analysis (STA) environment, the software program determines the area and count of CLBs 302 that communicate with each memory circuit 300. In particular, the software program generates collections of CLBs 302 with valid timing paths to each memory circuit 300. Collection is driven by a timing slack threshold as well as transitive pipeline depth (i.e., number of levels of timing paths). Additionally, the software program obtains intersections of memory circuits and CLB collections.

The software program may use different criteria to determine if an array style layout of the CLBs 302 and memory circuits 300 is beneficial and to determine parameters of the array. For example, a first criterion may be a ratio of maximum intersection of CLB area to an intersected memory area. A second criterion may be an absolute area of CLB intersection and an absolute area of intersected memory. The software program may determine density of CLB interconnects (i.e., number of CLBs 302 that communicate with common CLBs 302). For each timing starting point (typically a flip-flop in a CLB 302), the software program may generate a collection of timing paths from the starting point with slack less than a threshold and may store all CLB fanout included in the timing paths. The software program may find intersection of collections to determine CLB interconnect ratio. A third criterion may be an absolute size of STA driven, intersecting CLB. These criteria are a measure of an amount of cross-coupled, timing driven interconnects between the memory circuits 300 and between CLBs 302. These values are used to determine if an array style layout of the CLBs 302 and memory circuits 300 is beneficial and to determine the parameters of the array (e.g., row/column spacing, etc.).

Accordingly, the software program performs the analysis taking into account the interconnectivity between components and timing of signal paths between the components. Based on the analysis, the software program generates data regarding feasibility of placing the components in an array and parameters for the array (e.g., locations, spacing, etc. of the components in the array) instead of a user providing a list of circuits and the parameters for arranging the components in an array (e.g., locations for placing the circuits in the array).

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); a discrete circuit; an integrated circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be partially or fully implemented by one or more computer programs executed by one or more processors. The computer programs include processor-executable instructions that are stored on at least one non-transitory tangible computer readable medium. The computer programs may also include and/or rely on stored data. Non-limiting examples of the non-transitory tangible computer readable medium include nonvolatile memory, volatile memory, magnetic storage, and optical storage.

What is claimed is:

1. An integrated circuit comprising:
a plurality of memory circuits arranged on a die along a plurality of rows and a plurality of columns, wherein each memory circuit includes a plurality of memory cells, and wherein the plurality of rows and the plurality of columns are arranged in an area of the die; and
a plurality of logic circuits arranged on the die between the plurality of memory circuits along the plurality of rows and the plurality of columns, wherein the plurality of logic circuits are configured to communicate with one or more of the memory circuits, wherein a first logic circuit of the plurality of logic circuits shares one of the plurality of rows with two of the plurality of memory circuits, and wherein a second logic circuit of the plurality of logic circuits shares one of the plurality of columns with two of the plurality of memory circuits; and
wherein one or more of a processor, an additional memory, a communication module, and a power management module of the integrated circuit are arranged (i) along a perimeter of the die and (ii) around the area.

2. The integrated circuit of claim 1, wherein the memory cells include latch-based random access memory cells.

3. The integrated circuit of claim 1, wherein the logic circuits include at least one of combinational and sequential logic circuits.

4. The integrated circuit of claim 1, wherein the memory circuits have a predetermined memory capacity.

5. The integrated circuit of claim 1, wherein at least one of the plurality of memory circuits has a different memory capacity than others of the plurality of memory circuits.

6. The integrated circuit of claim 1, wherein at least one of the logic circuits is configured to:
process signals during a read or a write operation of a storage device, wherein the storage device includes a hard disk drive, an optical disc drive, or a solid-state disk; and
store data generated by the processing in one or more of the memory circuits.

7. The integrated circuit of claim 1, wherein at least one of the logic circuits is configured to:
process signals during a transmit or a receive operation of a communication device; and
store data generated by the processing in one or more of the memory circuits.

8. An integrated circuit comprising:
a plurality of memory circuits arranged on a die along a plurality of rows and a plurality of columns, wherein each memory circuit includes a plurality of memory cells, and wherein the plurality of rows and the plurality of columns are arranged in an area of the die; and
a plurality of logic circuits arranged on the die between the plurality of memory circuits along the plurality of rows and the plurality of columns, wherein the plurality of logic circuits are configured to communicate with one or more of the memory circuits,
wherein one or more of a processor, an additional memory, a communication module, and a power management module of the integrated circuit are arranged (i) along a perimeter of the die and (ii) around the area,
wherein a first one of the logic circuits is configured to (i) retrieve first data from a first one of the memory circuits, (ii) generate second data by processing the first data, and
(iii) store the second data in a second one of the memory circuits,
wherein a second one of the logic circuits is configured to (i) retrieve the second data from the second one of the memory circuits, (ii) generate third data by processing the second data, and (iii) store the third data in the first one of the memory circuits, and
wherein the first one of the logic circuits is configured to process the third data.

9. A system comprising:
an input module configured to receive data including (i) a list of memory circuits and logic circuits to be arranged on a die, (ii) timing of input and output signals of the memory circuits and the logic circuits, and (iii) an area of the die; and
a processing module configured to
process the data,
determine whether an area of a plurality of the logic circuits configured to communicate with a plurality of the memory circuits is greater than or equal to a predetermined percentage of an area of the plurality of the memory circuits, and
arrange the memory circuits and the logic circuits in an array-type layout on the area of the die in response to the area of the plurality of the logic circuits being greater than or equal to the predetermined percentage of the area of the plurality of the memory circuits.

10. The system of claim 9, wherein the processing module is configured to determine parameters including spacing between rows and columns of the array-type layout.

11. The system of claim 9, wherein the processing module is configured to distribute the logic circuits in the array-type layout according to the timing of input and output signals of the memory circuits and the logic circuits.

12. The system of claim 9, wherein the processing module is configured to distribute the logic circuits in the array-type layout according to connections of the memory circuits and the logic circuits.

13. A method comprising:
receiving data including (i) a list of memory circuits and logic circuits to be arranged on a die, (ii) timing of input and output signals of the memory circuits and the logic circuits, and (iii) an area of the die;
processing the data;
determining whether an area of a plurality of the logic circuits configured to communicate with a plurality of the memory circuits is greater than or equal to a predetermined percentage of an area of the plurality of the memory circuits; and
arranging the memory circuits and the logic circuits in an array-type layout on the area of the die in response to the area of the plurality of the logic circuits being greater than or equal to the predetermined percentage of the area of the plurality of the memory circuits.

14. The method of claim 13, further comprising determining parameters including spacing between rows and columns of the array-type layout.

15. The method of claim 13, further comprising distributing the logic circuits in the array-type layout according to the timing of input and output signals of the memory circuits and the logic circuits.

16. The method of claim 13, further comprising distributing the logic circuits in the array-type layout according to connections of the memory circuits and the logic circuits.

17. An integrated circuit comprising:
a plurality of memory circuits arranged on a die along a plurality of rows and a plurality of columns, wherein each memory circuit includes a plurality of memory cells, and wherein the plurality of rows and the plurality of columns are arranged in an area of the die; and
a plurality of logic circuits arranged on the die between the plurality of memory circuits along the plurality of rows and the plurality of columns, wherein the plurality of logic circuits are configured to communicate with one or more of the memory circuits,
wherein one or more of a processor, an additional memory, a communication module, and a power management module of the integrated circuit are arranged (i) along a perimeter of the die and (ii) around the area, and
wherein one of the plurality of logic circuits is arranged at an intersection of diagonals of a rectangle whose four vertices are two adjacent ones of the plurality of memory circuits located along a first column and two adjacent ones of the plurality of memory circuits along a second column, and wherein the first column is adjacent to the second column.

18. An integrated circuit comprising:
a plurality of memory circuits arranged on a die along a plurality of rows and a plurality of columns, wherein each memory circuit includes a plurality of memory cells, and wherein the plurality of rows and the plurality of columns are arranged in an area of the die; and
a plurality of logic circuits arranged on the die between the plurality of memory circuits along the plurality of rows and the plurality of columns, wherein the plurality of logic circuits are configured to communicate with one or more of the memory circuits,
wherein one or more of a processor, an additional memory, a communication module, and a power management module of the integrated circuit are arranged (i) along a perimeter of the die and (ii) around the area, and
wherein one of the plurality of logic circuits is arranged at an intersection of diagonals of a rectangle whose four vertices are two adjacent ones of the plurality of memory circuits located along a first row and two adjacent ones of the plurality of memory circuits along a second row, and wherein the first row is adjacent to the second row.

* * * * *